United States Patent
Sakata (10) Patent No.: US 8,910,977 B2
(45) Date of Patent: Dec. 16, 2014

(54) STEERING DEVICE

(71) Applicant: Jtekt Corporation, Osaka (JP)

(72) Inventor: Toru Sakata, Katsuragi (JP)

(73) Assignee: Jtekt Corporation, Osaka-Shi (JP)

(*) Notice: Subject to any disclaimer, the term of this patent is extended or adjusted under 35 U.S.C. 154(b) by 0 days.

(21) Appl. No.: 13/963,232

(22) Filed: Aug. 9, 2013

(65) Prior Publication Data

US 2014/0053677 A1 Feb. 27, 2014

(30) Foreign Application Priority Data

Aug. 22, 2012 (JP) .................................. 2012-183402

(51) Int. Cl.
*B62D 1/00* (2006.01)
*B62D 1/19* (2006.01)

(52) U.S. Cl.
CPC ....................................... *B62D 1/195* (2013.01)
USPC ........................................................ 280/777

(58) Field of Classification Search
USPC .............................. 280/775, 777; 74/492, 493
See application file for complete search history.

(56) References Cited

U.S. PATENT DOCUMENTS 5,961,146 A * 10/1999 Matsumoto et al. .......... 280/777
6,224,104 B1 * 5/2001 Hibino ........................ 280/777
8,033,574 B2 * 10/2011 Menjak et al. ................ 280/777
2002/0036404 A1 * 3/2002 Li et al. ........................ 280/777
2006/0049621 A1 * 3/2006 Lee ............................... 280/777
2007/0013183 A1 1/2007 Jensen et al.
2009/0218801 A1 * 9/2009 Park .............................. 280/777
2012/0193902 A1 * 8/2012 Akutsu et al. ................ 280/777

FOREIGN PATENT DOCUMENTS

EP 1 908 663 A2 4/2008
JP A-9-193812 7/1997
JP 2008114837 A * 5/2008

OTHER PUBLICATIONS

Apr. 25, 2014 Extended European Search Report issued in European Patent Application No. 13181014.5-1755.

* cited by examiner

*Primary Examiner* — Paul N Dickson
*Assistant Examiner* — Robert A Coker
(74) *Attorney, Agent, or Firm* — Oliff PLC (57) ABSTRACT

A steering device includes a steering column that rotatably supports a steering wheel, a column side bracket that supports the steering column, a vehicle body side bracket coupled to the column side bracket and an impact absorption mechanism that moves the steering column in a direction along the steering column in a second collision. The impact absorption mechanism includes an impact absorption member and a supporting member. The impact absorption member is integrally formed with an elastic supporting portion and an extending portion. The elastic supporting portion is supported by the vehicle body side bracket and elastically supports the steering column. The extending portion extends in a direction along the steering column. The supporting member is supported by a vehicle body and supports a part of the extending portion in a longitudinal direction of the extending portion.

8 Claims, 7 Drawing Sheets

PRIOR ART

F I G . 10

STEERING DEVICE

INCORPORATION BY REFERENCE

The disclosure of Japanese Patent Application No. 2012-183402 filed on Aug. 22, 2012 including the specification, drawings and abstract is incorporated herein by reference in its entirety.

BACKGROUND OF THE INVENTION

1. Field of the Invention

The present invention relates to a steering device that absorbs an impact force occurred between a steering wheel and a driver in a second collision.

2. Description of Related Art

If a vehicle frontally collides, a driver may collide with a steering wheel by interaction of inertia at the collision (second collision). Therefore, the following steering device has been proposed. If a load equal to or more than a predetermined load interacts with a steering column by the second collision, the steering device moves the steering wheel to the frontward of the vehicle to absorb an impact force occurred between the driver and the steering wheel (for example, see Japanese Patent Application Publication No. 9-193812 (JP 9-193812 A)).

Figure 10:
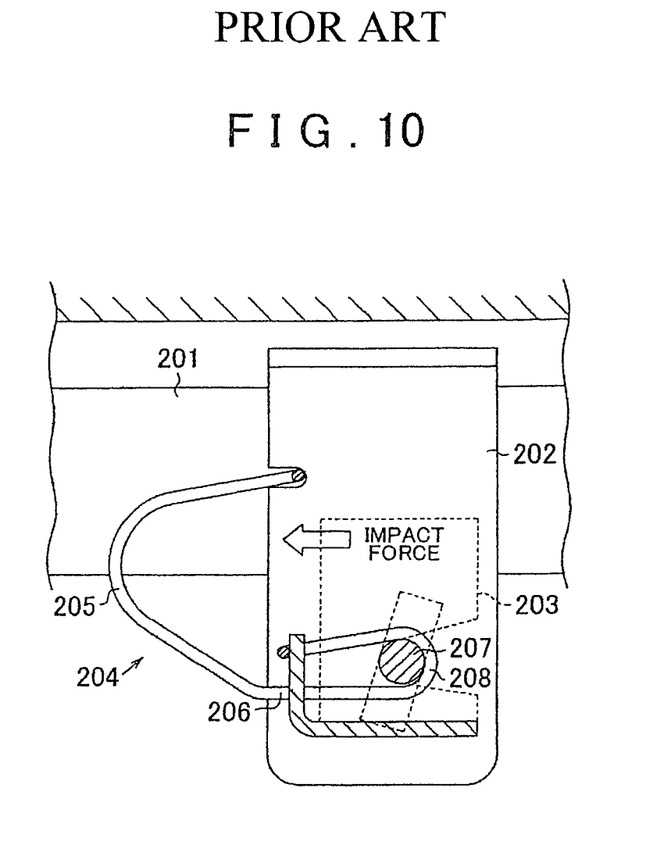
FIG. 10 is a side view schematically illustrating a steering device of the related art

Such steering device, as illustrated in FIG. 10, includes a steering column 201 that rotatably supports a steering wheel, a support plate portion 202 that supports the steering column 201, and a support bracket 203 as a vehicle body side bracket supported by the vehicle body. The steering device further includes an impact absorption member 204 formed with a metal wire rod.

This impact absorption member 204 includes an elastic supporting portion 205 and an impact absorption portion 206, which are integrally configured. Such impact absorption member 204 is supported by a support bracket 203 and elastically supports the support plate portion 202 by the elastic supporting portion 205. The impact absorption portion 206 includes an approximately U-shaped engaged portion 208 engaged a tilt shaft 207, which is mounted to the support bracket 203. If a second collision occurs, the impact absorption portion 206 deforms so as to change the position of the engaged portion 208. Consequently, the steering column 201 moves in a direction away from the driver while impact force in accordance with the second collision is absorbed by the impact absorption portion 206 and the tilt shaft 207.

SUMMARY OF THE INVENTION

The steering column 201 supports a combination switch that includes a turn indicator lever, a windshield wiper lever, or similar member at a position between the support bracket 203 and the steering wheel. If the second collision occurs, the combination switch moves in the direction away from the driver together with the steering column 201. However, at this time, the combination switch may contact the support plate portion 202. This contact may restrict the forward movement of the steering column 201.

The present invention provides a steering device that allows sufficiently ensuring a movement amount of a steering wheel to a frontward of a vehicle in a second collision.

The steering device according to an aspect of the present invention includes a steering column, a column side bracket, a vehicle body side bracket, and an impact absorption mechanism. The steering column rotatably supports a steering wheel. The column side bracket supports the steering column. The vehicle body side bracket is coupled to the column side bracket. The impact absorption mechanism moves the steering column in a direction along the steering column in a second collision. The impact absorption mechanism includes an impact absorption member and a supporting member. The impact absorption member is integrally formed with an elastic supporting portion and an extending portion. The elastic supporting portion is supported by the vehicle body side bracket and elastically supports the steering column. The extending portion extends in a direction along the steering column. The supporting member is supported by a vehicle body and supports a part of the extending portion in a longitudinal direction.

With the above-described aspect, if the second collision occurs, the steering column and the column side bracket move away from the driver in the direction along the steering column. At this time, the vehicle body side bracket coupled to the column side bracket and the impact absorption member supported by this vehicle body side bracket also move in the direction away from the driver. Accordingly, a portion supported by the supporting member at the extending portion of the impact absorption member (hereinafter also referred to as a "supported portion") relatively deflects in accordance with the movement of the vehicle body side bracket to the frontward of the vehicle. As a result, an impact force occurred between the steering wheel and the driver when the steering column and the vehicle body side bracket move to the frontward of the vehicle can be absorbed by the extending portion and the supporting member of the impact absorption member.

As described above, the vehicle body side bracket moves together with, for example, the steering column, to the frontward of the vehicle. Therefore, a contact between a combination switch mounted to the steering column and the vehicle body side bracket is suppressed. Accordingly, the movement amount of the steering wheel to the frontward of the vehicle in the second collision can be sufficiently ensured.

The impact absorption member is integrally disposed at the elastic supporting portion, which elastically supports the steering column. This allows reducing the number of components and simplifying the structure compared with the case where the elastic supporting portion and the impact absorption member are formed separately. The layout as the steering device can also be improved.

In the above-described aspect, the impact absorption member may be made of a flexible wire rod. The supporting member may include a main body portion and a supporting portion. The main body portion is secured to the vehicle body. The main body portion supports the vehicle body side bracket. The supporting portion supports a part of the extending portion in the longitudinal direction. In this case, the main body portion of the supporting member may allow the vehicle body side bracket to leave from the vehicle body when a load equal to or more than a predetermined load interacts with the vehicle body side bracket in the second collision.

In the above-described configuration, when the load equal to or more than the predetermined load interacts with the vehicle body side bracket by the second collision, the vehicle body side bracket is allowed to leave from the main body portion of the supporting member. The start of leaving of the vehicle body side bracket from the main body portion, namely, the vehicle body, significantly absorbs the impact force applied to the vehicle body side bracket (first absorption).

In the above-described configuration, when the vehicle body side bracket starts moving to the direction away from the driver by the second collision, the supported portion of the extending portion of the impact absorption member relatively deflects in accordance with the movement of the vehicle body side bracket. That is, in the movement of the vehicle body side bracket, the impact force in accordance with the second collision is absorbed by the extending portion and the supporting portion (second absorption).

Meanwhile, the steering device may further include a mounting member and a sandwich member. The mounting member is mounted to the vehicle body and supports the vehicle body side bracket so that the vehicle body side bracket slidably moves in the direction along the steering column. The sandwich member is disposed at the opposite side of the vehicle body side bracket sandwiching the mounting member. The sandwich member sandwiches the mounting member with the vehicle body side bracket. In this case, the supporting member may be immovably disposed at the mounting member. The vehicle body side bracket and the sandwich member may start leaving from the mounting member when a load equal to or more than a predetermined load interacts with the vehicle body side bracket in the second collision.

In the above-described configuration, when a load equal to or more than a predetermined load interacts with the vehicle body side bracket in the second collision, the vehicle body side bracket and the sandwich member start leaving from the mounting member, and the vehicle body side bracket starts slidably and relatively moving to the frontward of the vehicle with respect to the mounting member. Thus, when vehicle body side bracket starts leaving from the vehicle body, the impact force applied to the vehicle body side bracket is significantly absorbed (first absorption).

In the above-described configuration, when the vehicle body side bracket starts moving to the direction away from the driver by the second collision, the supported portion of the extending portion of the impact absorption member relatively deflects in accordance with the movement of the vehicle body side bracket. That is, in the movement of the vehicle body side bracket, the impact force in accordance with the second collision is absorbed by the extending portion and the supporting member (second absorption).

The extending portion may have a length set so that a relative movement amount of the vehicle body side bracket with respect to the supporting member in the second collision is larger than a movement amount required for the vehicle body side bracket to leave from the vehicle body in the second collision.

With the above-described configuration, when the second collision occurs, even after the vehicle body side bracket leaves from the vehicle body by the first absorption, the steering column moves in the direction away from the driver through the second absorption by the extending portion and the supporting member. That is, the second absorption is performed even after the first absorption is completed. Consequently, there is high possibility that the steering column is supported by the vehicle body side via the extending portion even after the movement of the steering column caused by the second collision is completed. Accordingly, a drop of the steering column from the vehicle body in the second collision can be easily restricted.

With this aspect, the movement amount of the steering wheel to the frontward of the vehicle in the second collision can be sufficiently ensured.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
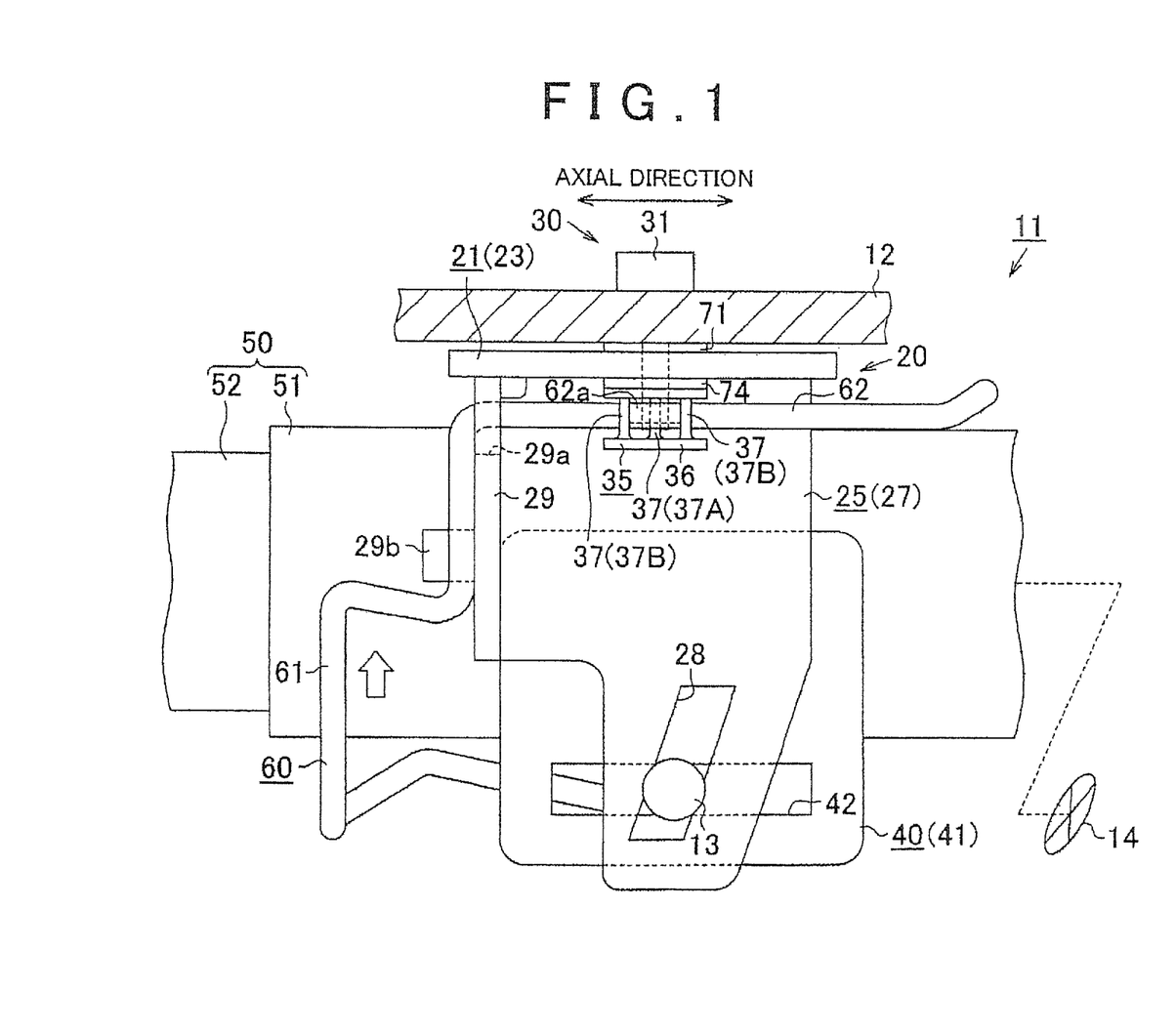
FIG. 1 is a side view schematically illustrating a first embodiment of a steering device according to the present invention.
Figure 2:
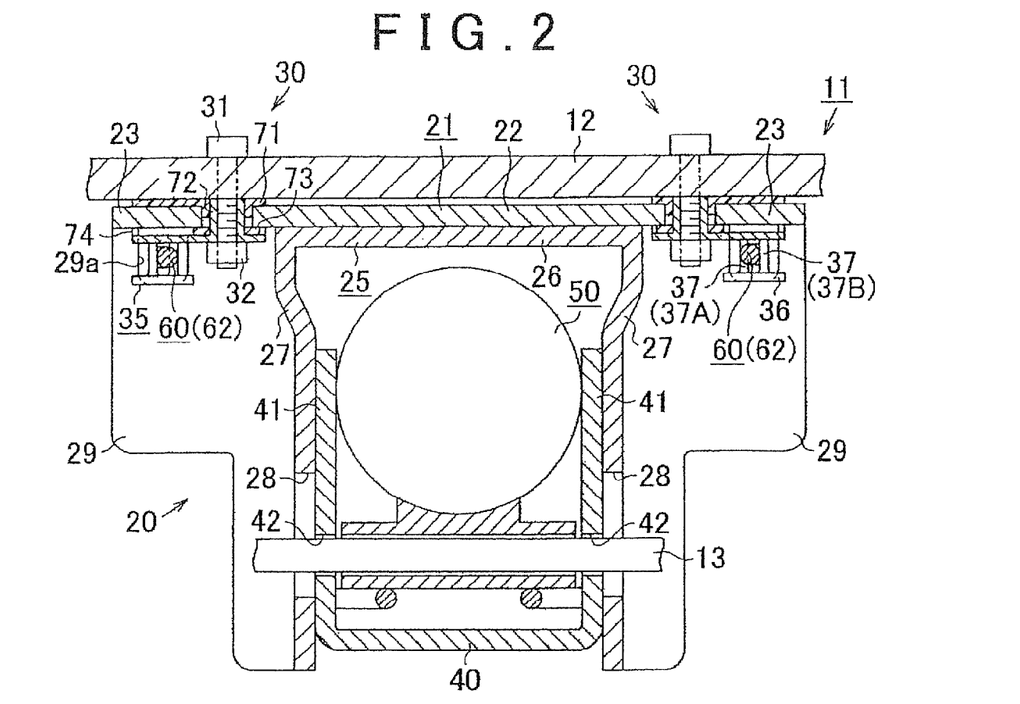
FIG. 2 is a cross section schematically illustrating the steering device according to the first embodiment.

One embodiment that embodies the present invention will now be described with reference to FIG. 1 to FIG. 5B. Hereafter, in the explanation of this description, the right-left direction in FIG. 1 is referred to as an "axial direction" and the right-left direction in FIG. 2 is referred to as a "vehicle width direction". The left side in FIG. 1 is referred to as a "front side", and the right side in FIG. 1 is referred to as a "rear side".

As illustrated in FIG. 1 and FIG. 2, a steering device 11 of the vehicle includes a vehicle body side bracket 20 supported by a mounting stay 12, which indicates a part of the vehicle body, and a mounting mechanism 30 (also referred to as a "capsule mechanism") to mount the vehicle body side bracket 20 to the mounting stay 12. The steering device 11 further includes a column side bracket 40, which is coupled to the vehicle body side bracket 20 by a spindle 13 extending in the vehicle width direction, a steering column 50 supported by the column side bracket 40, and a steering wheel 14 rotatably supported by the steering column 50. Such steering device 11 has a function to adjust a telescopic position of the steering wheel 14 (that is, a position in the axial direction) and a function to adjust a tilt angle of the steering wheel 14.

The steering column 50 includes an outer tube 51, which houses a hollow upper shaft (not shown) where the steering wheel 14 is secured, and an inner tube 52 inserted into the outer tube 51. The inner tube 52 internally houses a lower shaft housed in the upper shaft. In FIG. 2, the illustration of a specific configuration of the steering column 50 is omitted.

The column side bracket 40 forms an approximately U shape when viewed from the axial direction. Such column side bracket 40 supports the steering column 50 via sidewalls 41 disposed at both sides of the steering column 50 in the vehicle width direction. Telescopic long holes 42 are formed at both of the sidewalls 41 of the column side bracket 40 along the axial direction. The spindle 13 passes through the pair of telescopic long holes 42. By adjusting the position of the spindle 13 in the telescopic long holes 42, the telescopic position of the steering wheel 14 is adjusted.

The vehicle body side bracket 20 includes a flat plate-shaped plate portion 21 facing the mounting stay 12 and an adjustment bracket 25 located opposite side (lower side in FIG. 2) of the mounting stay 12 sandwiching this plate portion 2L This adjustment bracket 25 is integrally formed with the plate portion 21. Such adjustment bracket 25 forms an approximately U shape viewed from the axial direction. The adjustment bracket 25 includes a main body portion 26, which comes into surface contact with the plate portion 21, and a pair of sidewalls 27 disposed upright at both sides of the main body portion 26 in the vehicle width direction.

These sidewalls 27 of the adjustment bracket 25 are located outside of the sidewall 41 of the column side bracket 40 in the vehicle width direction. Each sidewall 27 includes a tilt long hole 28 along a tilt direction of the steering column 50. The spindle 13 passes through the pair of tilt long holes 28. That is, the adjustment bracket 25 supports the steering column 50 via the spindle 13 and the column side bracket 40. By adjusting the position of the spindle 13 in the tilt long hole 28, the tilt angle of the steering wheel 14 is adjusted.

The adjustment bracket 25 includes a wall portion 29 that functions as a reinforcing portion to enhance rigidity of the adjustment bracket 25. The wall portion 29 is protruded outside from the front end of the sidewall 27 in the vehicle width direction. The wall portion 29 includes an insertion cutout 29a at the upper end.

Figure 3:
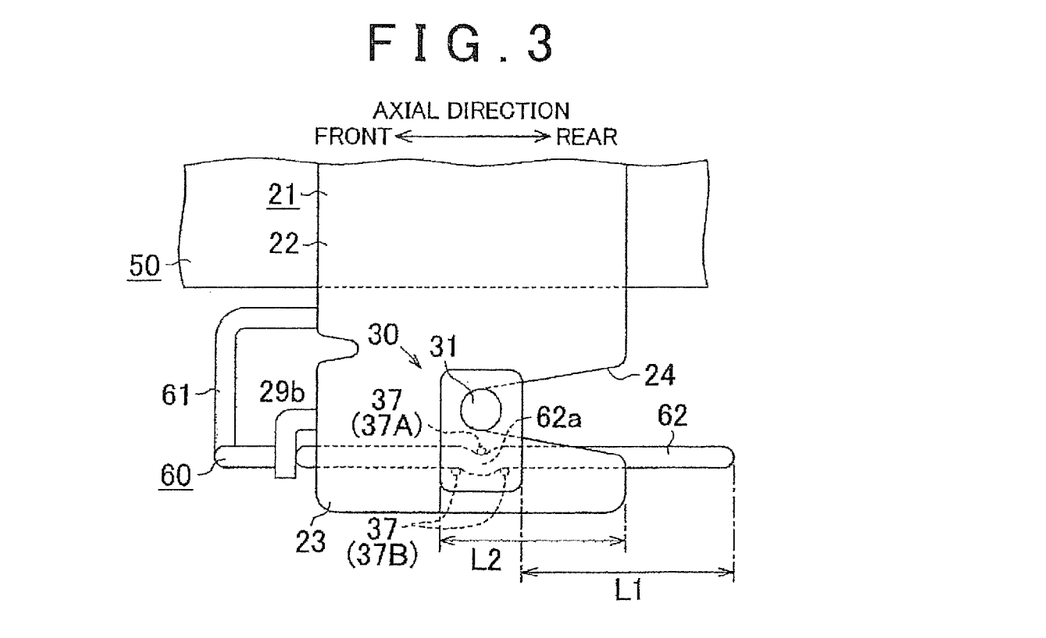
FIG. 3 is a plan view schematically illustrating the steering device according to the first embodiment.

As illustrated in FIG. 3, the plate portion 21 includes a facing portion 22, which faces the main body portion 26 of the adjustment bracket 25, and a pair of extending portions 23, which are located at both sides of the facing portion 22 in the vehicle width direction. These extending portions 23 extend outside from the facing portion 22 in the vehicle width direction. The extending portion 23 includes a tightening cutout 24 at the rear end side.

The steering device 11 according to the embodiment includes an impact absorption member 60 formed by one flexible metal wire rod. This impact absorption member 60 includes a pair of elastic supporting portions 61, which are located outside with respect to the steering column 50 in the vehicle width direction, and a pair of linear portions 62 extending along the axial direction. That is, the impact absorption member 60 functions as a so-called tilt spring. In this embodiment, the linear portion 62 is an example of "the extending portion of the impact absorption member".

The elastic supporting portion 61 is supported by the adjustment bracket 25 while elastically supporting the steering column 50. The base portion of such elastic supporting portion 61 is located front side of the wall portion 29 of the adjustment bracket 25. The base portion is engaged to an engagement portion 29b formed at this wall portion 29. A part of the elastic supporting portion 61 positions the steering column 50 along its lower end. That is, the elastic supporting portion 61 of the impact absorption member 60 elastically supports the steering column 50 and members supporting the steering column 50 (the spindle 13, the adjustment bracket 25, the column side bracket 40, and similar member).

As illustrated in FIG. 2 and FIG. 3, the linear portion 62 extends from the front side of the wall portion 29 of the adjustment bracket 25 to backward via the insertion cutout 29a. Specifically, the linear portion 62 extends backward with respect to the vehicle body side bracket 20. That is, the length of the linear portion 62 is configured enough not to inhibit the movement of the steering column 50 along the axial direction in the second collision. In other words, even if a load with the maximum value, which is a value assumed from the design of the steering device 11, occurs in the second collision, the length of the linear portion 62 is configured to avoid drop of the steering column 50 from the vehicle body.

Next, the mounting mechanism 30 is described with reference to FIG. 2 to FIG. 4B. As illustrated in FIG. 2 and FIG. 3, the mounting mechanism 30 as an example of the supporting member is mounted to the mounting stay 12 by a bolt 31 and a nut 32. Such mounting mechanism 30 includes a flat plate-shaped capsule 71 interposed between the mounting stay 12 and the extending portion 23 of the plate portion 21. The mounting mechanism 30 includes a cylindrical-shaped collar 72 through which a screw shank of the bolt 31 is inserted, a circular ring-shaped diaphragm spring 73 fitted onto the collar 72, and a housing 74, which houses the diaphragm spring 73. In this embodiment, the screw shank of the bolt 31 passes through the tightening cutout 24 formed at the extending portion 23 of the plate portion 21.

The mounting mechanism 30 is secured to the mounting stay 12 in a state where the diaphragm spring 73 is elasticity deformed by screwing the nut 32 at the distal end of the screw shank of the bolt 31. The biasing force of this diaphragm spring 73 causes a friction force to interact corresponding to the biasing force between the capsule 71 and the plate portion 21 and between the capsule 71 and the mounting stay 12 when the plate portion 21 leaves from the vehicle body. Accordingly, in this embodiment, the capsule 71, the collar 72, the diaphragm spring 73, and the housing 74 constitute "the main body portion secured to the vehicle body and supports the vehicle body side bracket 20".

Figure 4A:
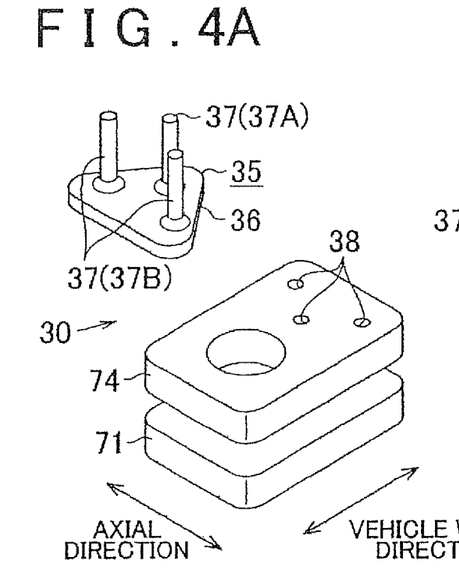
FIG. 4A is a perspective view illustrating a disassembled mounting mechanism.
Figure 4B:
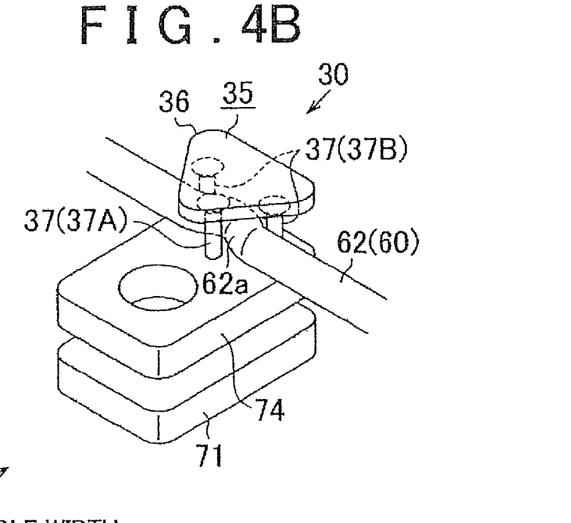
FIG. 4B is a perspective view of the mounting mechanism.

As illustrated in FIG. 4A and FIG. 4B, the mounting mechanism 30 according to this embodiment further includes a holding member 35 as one example of a supporting portion mounted to a part below the plate portion 21. This holding member 35 includes a main body portion 36 of approximately triangular shape in plan view and a plurality of (preferably, equal to or more than 3) pin portions 37 projecting from this main body portion 36. These pin portions 37 include a first pin portion 37A located at a first position and a second pin portion 37B located at a second position different from the first position in the vehicle width direction.

The housing 74 includes a plurality of hole portions 38 at the mounting position of the holding member 35. The plurality of hole portions 38 individually corresponds to the respective pin portions 37 (37A and 37B). Press-fitting the distal end of the pin portion 37 to the hole portion 38 mounts the holding member 35 to the housing 74. In this embodiment, this holding member 35 supports a part of the linear portion 62 of the impact absorption member 60 with a predetermined supporting force. The linear portion 62 includes a supported portion 62a supported by the holding member 35. The supported portion 62a meanders passing through between the respective pin portions 37.

Next, an interaction of the steering device 11 in the second collision is described with reference to FIG. 5A and FIG. 5B. If the second collision, where the vehicle during running frontally collides and the driver collides with the steering wheel 14, occurs, the steering column 50 moves to the frontward of the vehicle so that the spindle 13 reaches the edge portion at the rear side of the telescopic long hole 42. Even in this state, if a load equal to or more than the predetermined load is applied to the vehicle body side bracket 20 via the steering wheel 14 or similar member, the vehicle body side bracket 20 leaves from the vehicle body and moves forward.

Figure 5A:
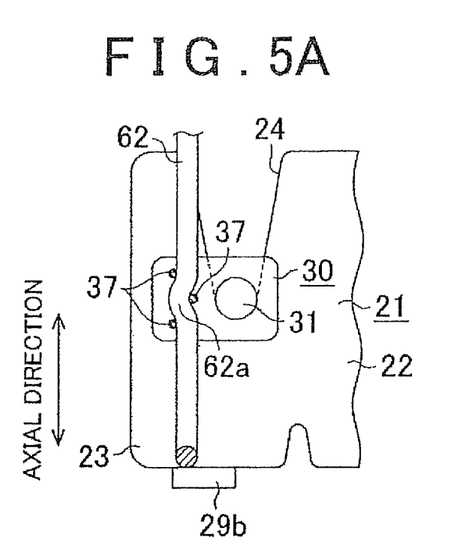
FIG. 5A is an interaction diagram illustrating a state of when a second collision occurs.
Figure 5B:
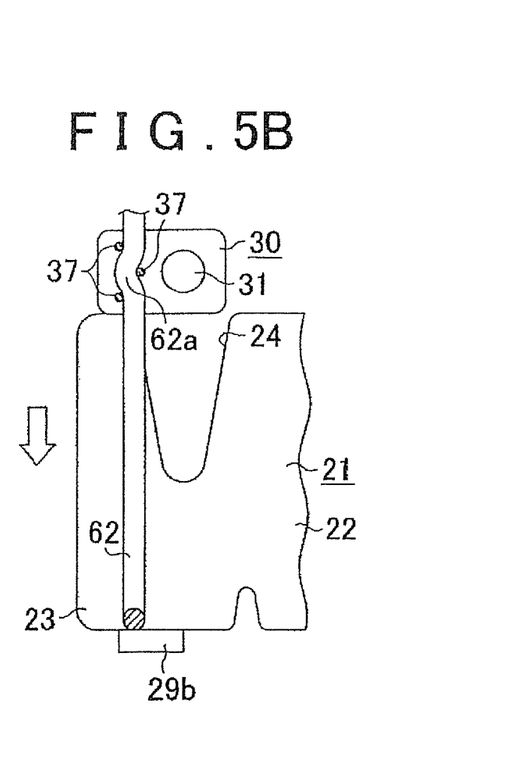
FIG. 5B is an interaction diagram illustrating the state of when the second collision occurs.

That is, as illustrated in FIG. 5A and FIG. 5B, if a load equal to or more than the predetermined value is applied to the vehicle body side bracket 20, the vehicle body side bracket 20 starts leaving from the mounting mechanism 30 forward (first absorption). That is, the vehicle body side bracket 20 relatively starts moving forward with respect to the mounting stay 12.

The linear portion 62 of the impact absorption member 60 is partially supported at a predetermined supporting force by the holding member 35 secured to the housing 74. When the vehicle body side bracket 20 starts moving forward by the second collision, the supported portion 62a supported by the holding member 35 relatively deflects at the linear portion 62 of the impact absorption member 60. That is, the supported portion 62a deflects forward of the holding member 35.

At this time, the portion newly supported by the holding member 35 at the linear portion 62 in accordance with the movement of the vehicle body side bracket 20 is deformed by arrangement of the respective pin portions 37A and 37B constituting the holding member 35, or similar. That is, a part of impact force occurred by the second collision is transformed to a force that deforms the linear portion 62 (second absorption). As a result, an impact force in the second collision is absorbed by the linear portion 62 and the holding member 35. Accordingly, in this embodiment, the mounting mechanism 30 and the impact absorption member 60 constitute "an impact absorption mechanism that moves the steering wheel 14 in a direction along the steering column 50 in the second collision."

Thus, even if the vehicle body side bracket 20 moves forward, a supporting force added from the holding member 35 to the linear portion 62 does not significantly change. Therefore, absorption efficiency of an impact force by the second absorption does not change so much. That is, after the vehicle body side bracket 20 starts leaving from the mounting mechanism 30, the impact force is absorbed almost constant.

As illustrated in FIG. 5B, even leaving of the vehicle body side bracket 20 from the mounting mechanism 30 is completed, the linear portion 62 of the impact absorption member 60 is supported by the holding member 35. That is, as illustrated in FIG. 3, a movement amount L1, which is a relative movement amount of the vehicle body side bracket 20 with respect to the mounting mechanism 30 in the second collusion, is longer than a movement amount L2, which is a movement amount required for the vehicle body side bracket 20 to completely leave from the mounting mechanism 30. In other words, even after the vehicle body side bracket 20 completely leaves from the mounting mechanism 30, the second absorption continues.

Even after the forward movement of the vehicle body side bracket 20 in accordance with the second collision is completed, the vehicle body side bracket 20 is supported by the vehicle body via the impact absorption member 60. This restricts drop of the steering column 50 supported to the vehicle body side bracket 20 via the column side bracket 40 or similar member from the vehicle body.

As described above, in this embodiment, the following effects can be obtained. The following describes a first effect. Upon occurrence of the second collision, the steering column 50 and the column side bracket 40 move away from the driver in the axial direction. At this time, the vehicle body side bracket 20 and the impact absorption member 60 supported by this vehicle body side bracket 20 also move forward. Accordingly, the portion, which is supported by the holding member 35, of the linear portion 62 of the impact absorption member 60 deflects in accordance with the forward movement of the vehicle body side bracket 20. Consequently, the contact between the combination switch mounted to the steering column 50 and the vehicle body side bracket 20 is suppressed. Accordingly, the movement amount of the steering wheel 14 to the frontward of the vehicle in the second collision can be sufficiently ensured.

The following describes a second effect. The linear portion 62 is integrally disposed to the elastic supporting portion 61, which elastically supports the steering column 50. This allows reducing the number of components and simplifying the structure compared with the case where the elastic supporting portion 61 and the linear portion 62 are formed separately. The layout as the steering device 11 can also be improved.

The following describes a third effect. In this embodiment, when the second collision occurs and a load equal to or more than the predetermined load interacts with the vehicle body side bracket 20, the vehicle body side bracket 20 starts leaving from the mounting mechanism 30 (first absorption). This first absorption allows significantly absorbing an impact force interacted with the vehicle body side bracket 20.

The following describes a fourth effect. Even after the vehicle body side bracket 20 starts leaving from the mounting mechanism 30, the forward movement of the vehicle body side bracket 20 allows absorbing an impact force by the linear portion 62 of the impact absorption member 60 and the holding member 35 of the mounting mechanism 30 (second absorption). In the forward movement of the vehicle body side bracket 20, the supporting force applied from the holding member 35 to the linear portion 62 is almost constant. Therefore, dispersion of absorption efficiency of the impact force by the second absorption can be reduced.

The following describes a fifth effect. In this embodiment, the length of the linear portion 62 is configured so that the linear portion 62 is partially supported by the holding member 35 even if the forward movement of the steering column 50 in the second collision is completed. Therefore, even after the second collision, the steering column 50 is supported to the vehicle body via the impact absorption member 60 or similar member. That is, a drop of the steering wheel 14 downward in the second collision can be suppressed. Even if the steering wheel 14 drops downward, the amount of drop can be less compared with the case where the steering column completely drops from the vehicle body due to the second collision. Accordingly, protection performance for the driver upon second collision can be improved.

The following describes a sixth effect. Performance required for the steering device differs depending on a vehicle type. Like this embodiment, for example, a steering device that has an impact absorption function for the second collision (hereinafter referred to as a "first device") may be employed, or a steering device that does not have the impact absorption function for the second collision (hereinafter referred to as a "second device") may be employed.

In this embodiment, as a tilt spring disposed between the vehicle body side bracket 20 and the column side bracket 40, the impact absorption member 60 where the elastic supporting portion 61 and the linear portion 62 are integrally formed is employed. In the first device, partially supporting the linear portion 62 by the holding member 35 allows having the impact absorption function for the second collision. In contrast to this, in the second device, the impact absorption member 60 can be employed as a tilt spring by omitting the holding member 35. Accordingly, the impact absorption member 60 according to this embodiment is applicable to not only production of the first device but also production of the second device. That is, this eliminates the need for preparing tilt springs with different shapes, characteristics, or similar depending on the type of the steering device.

Next, the second embodiment of the present invention is described with reference to FIG. 6 to FIG. 9B. The second embodiment differs from the first embodiment in a configuration where the vehicle body side bracket is supported by the vehicle body side or similar configuration. Accordingly, the following mainly describes a part different from the first embodiment. Like reference numerals designate corresponding or identical elements throughout the first embodiment and the second embodiment, and therefore such elements will not be further elaborated here.

Figure 6:
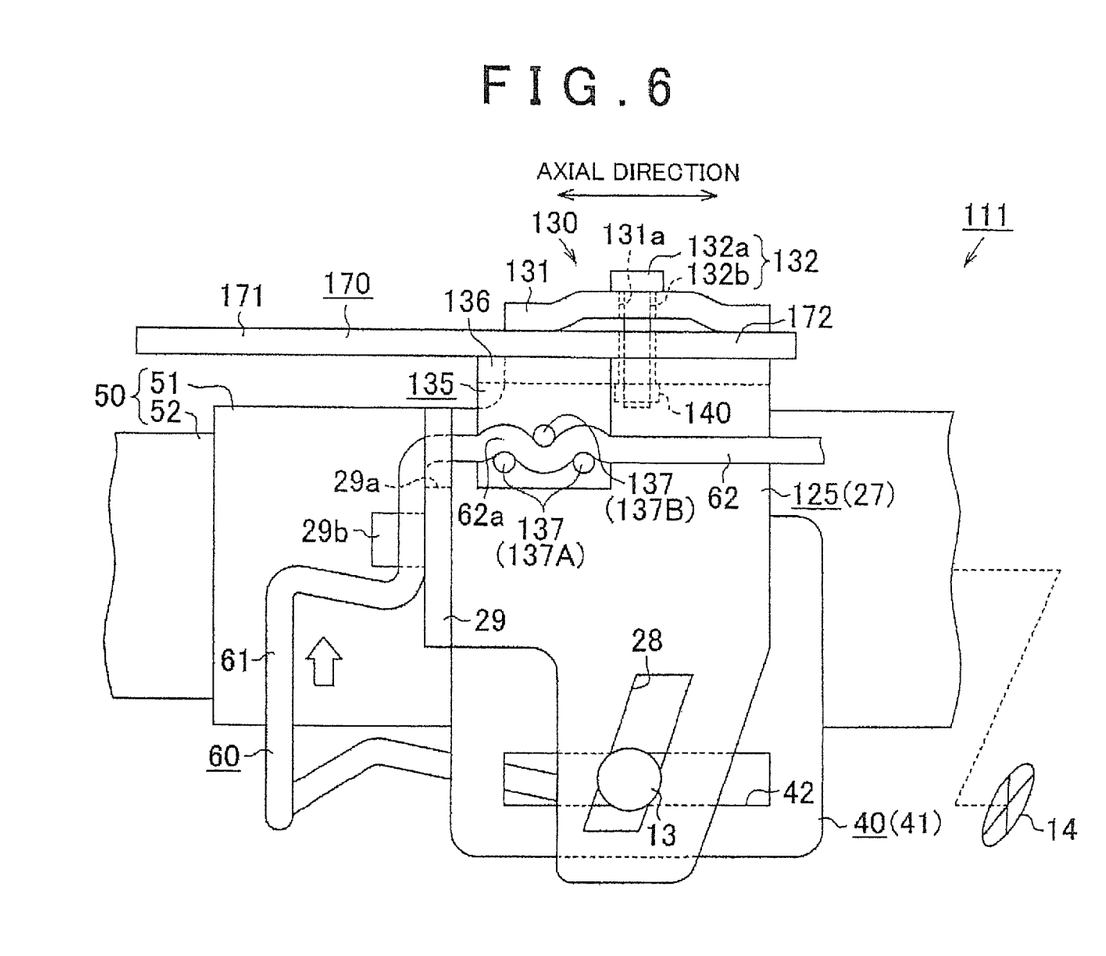
FIG. 6 is a side view schematically illustrating a second embodiment of the steering device according to the present invention.

As illustrated in FIG. 6, a steering device 111 according to this embodiment includes a top panel member 170 as one example of a mounting member supported to the vehicle body. An adjustment bracket 125 constituting a vehicle body side bracket is supported to the top panel member 170 via a mounting mechanism 130. The steering device 111 includes a pair of holding members 135 as a supporting member that supports a part (that is, the supported portion 62a) of the linear portion 62 of the impact absorption member 60. These both holding members 135 are immovably mounted to the top panel member 170. Both of the holding members 135 are disposed interposing the steering column 50 between themselves in the vehicle width direction.

Figure 7:
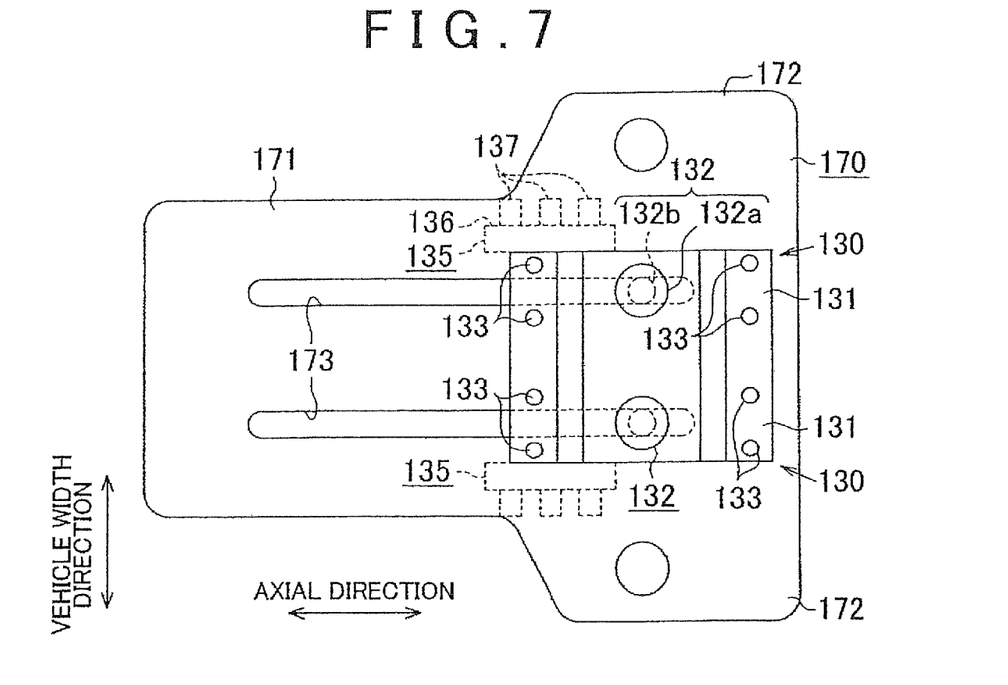
FIG. 7 is a plan view schematically illustrating a top panel member and the mounting mechanism.

As illustrated in FIG. 7, the top panel member 170 integrally includes a flat plate-shaped top panel main body 171 and a mounting portion 172 extended from this top panel main body 171 to outside in the vehicle width direction. The top panel member 170 is supported to the vehicle body via both of the mounting portions 172.

Both of the holding members 135 are mounted to the top panel main body 171. The top panel member 170 includes a pair of guide holes 173 extending in the axial direction at the inside of both of the holding members 135 in the vehicle width direction. These guide holes 173 have a length in the axial direction corresponding to the movement amount of the adjustment bracket 125 in the second collision.

Figure 8:
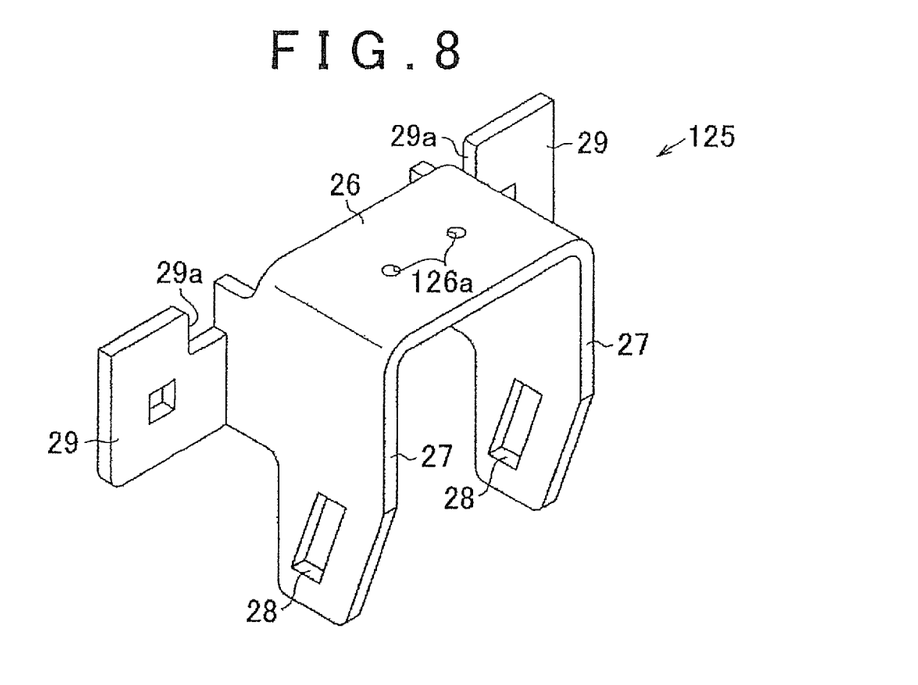
FIG. 8 is a perspective view illustrating an adjustment bracket.

As illustrated in FIG. 8, the adjustment bracket 125 integrally includes the main body portion 26, the pair of sidewalls 27, the wall portion 29, and the engagement portion 29b. The main body portion 26 includes a pair of coupling holes 126a. The pair of coupling holes 126a communicate with a pair of guide holes 173 formed at the top panel main body 171. The engagement portion 29b is disposed at the back surface side of the wall portion 29 (position that cannot be visually perceived in FIG. 8).

As illustrated in FIG. 6 and FIG. 7, the mounting mechanism 130 according to this embodiment includes a rectangle mounting plate 131 as one example of a sandwiching member, which is disposed on the top surface of the top panel main body 171 of the top panel member 170, and a coupling bolt 132 for coupling this mounting plate 131 to the adjustment bracket 125. The coupling bolt 132 includes a head 132a engaged with the mounting plate 131. The coupling bolt 132 includes a screw shank 132b inserted through an insertion hole 131a formed at the mounting plate 131, the guide hole 173 of the top panel member 170, and a coupling hole 126a formed at the main body portion 26 of the adjustment bracket 125. By screwing a nut 140 at the distal end of the screw shank 132b, the mounting plate 131 is coupled to the adjustment bracket 125. That is, the top panel member 170 supported by the vehicle body is sandwiched by the adjustment bracket 125 and the mounting plate 131. This causes a friction force to interact corresponding to a sandwich force between the adjustment bracket 125 and the top panel member 170 when the adjustment bracket 125 leaves from the vehicle body.

As illustrated in FIG. 6 and FIG. 7, a plurality of pin members 133 with distal ends engaged with the top panel member 170 are mounted to the mounting plate 131 according to this embodiment. The pin members 133 are made of synthetic resin. If a load equal to or more than the predetermined load interacts with the adjustment bracket 125 by the second collision, each pin member 133 is sheared and the adjustment bracket 125 starts leaving from the top panel member 170 against the above-described friction force. This allows the adjustment bracket 125 to start leaving from the top panel member 170, that is, the vehicle body, and to slidably move with respect to the top panel member 170.

As illustrated in FIG. 6 and FIG. 7, the holding member 135 according to this embodiment includes a main body portion 136 of approximately rectangle shape and a plurality of (preferably, equal to or more than 3) pin portions 137 projecting from this main body portion 136 outside in the vehicle width direction. These pin portions 137 include a first pin portion 137A located at a first position and a second pin portion 137B located at a second position different from the first position in the vertical direction. This holding member 135 supports a part of the linear portion 62 of the impact absorption member 60 by a predetermined supporting force. The linear portion 62 includes the supported portion 62a supported by the holding member 135. The supported portion 62a meanders passing through between the respective pin portions 137A and 137B.

Next, an interaction of the steering device 111 in the second collision is described with reference to FIG. 9A and FIG. 9R If the second collision, where the vehicle during running frontally collides, occurs, a load is applied to the adjustment bracket 125 via the steering wheel 14 or similar member. At this time, if a load equal to or more than the predetermined load is applied to the adjustment bracket 125, the adjustment bracket 125 leaves from the top panel member 170 and moves forward.

Figure 9A:
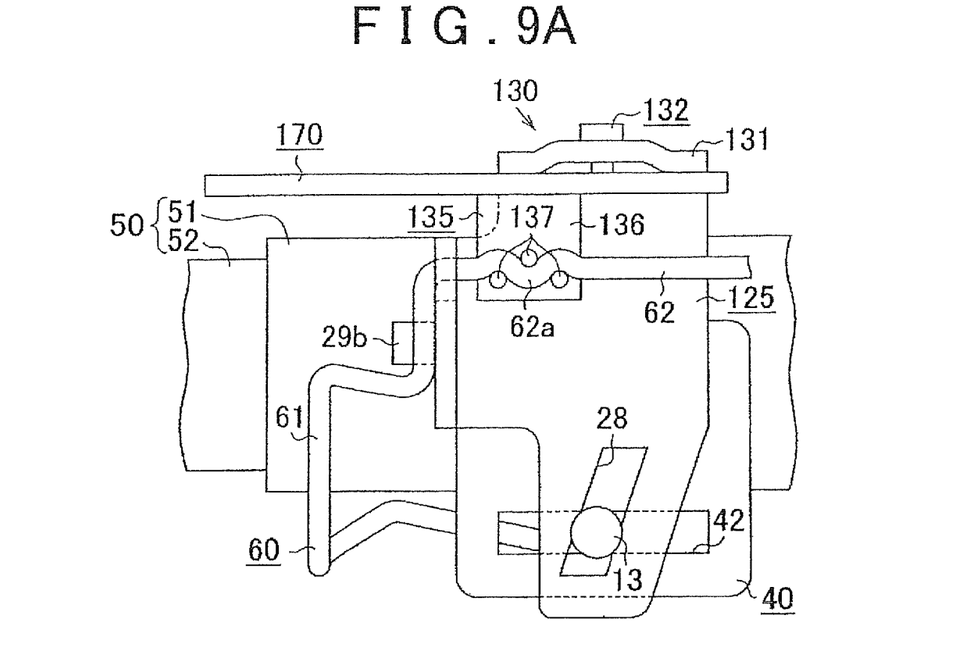
FIG. 9A is an interaction diagram illustrating a state of when the second collision occurs.
Figure 9B:
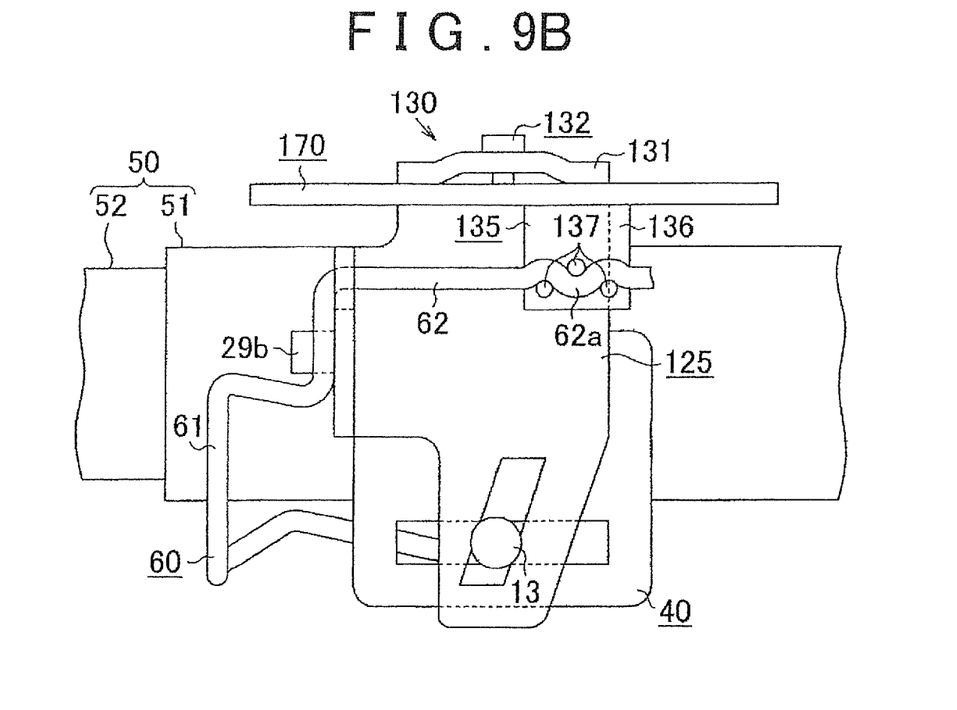
FIG. 9B is an interaction diagram illustrating the state of when the second collision occurs.

That is, as illustrated in FIG. 9A and FIG. 9B, the load is also applied to the mounting mechanism 130 coupled to the adjustment bracket 125 and each pin member 133 coupling the mounting plate 131 of the mounting mechanism 130 and the top panel member 170. As a result, each pin member 133 is sheared by the load, and the adjustment bracket 125, which sandwiching the top panel member 170 with the mounting plate 131, starts leaving from the top panel member 170 (first absorption). Then, the adjustment bracket 125, the column side bracket 40, and the steering column 50 start moving forward with respect to the top panel member 170.

The linear portion 62 of the impact absorption member 60 is partially supported at a predetermined supporting force by the holding member 135 secured to the top panel member 170. When the adjustment bracket 125 starts moving forward by the second collision, the supported portion 62a supported by the holding member 135 relatively deflects at the linear portion 62 of the impact absorption member 60 (second absorption). That is, the supported portion 62a deflects forward of the holding member 135. At this time, the adjustment bracket 125, the column side bracket 40, and the steering column 50 move forward while being guided by the screw shank 132b of the coupling bolt 132 of the mounting mechanism 130 and the guide hole 173 of the top panel member 170. Accordingly, in this embodiment, the mounting mechanism 130 and the impact absorption member 60 constitute "the impact absorption mechanism."

As described above, in this embodiment, the following effects can be further obtained in addition to the effects similar to the first, second, fifth, and sixth effects according to the above-described first embodiment. In this embodiment, if the second collision occurs and a load equal to or more than the predetermined load interacts with the adjustment bracket 125, the adjustment bracket 125, which sandwiches the top panel member 170 with the mounting plate 131, starts leaving from the vehicle body (first absorption). This allows significantly absorbing the impact force interacts with the adjustment bracket 125.

Even after the adjustment bracket 125 starts leaving from the top panel member 170, the forward movement of the adjustment bracket 125 allows absorbing the impact force by the linear portion 62 of the impact absorption member 60 and the holding member 135 mounted to the top panel member 170 (second absorption). In the forward movement of the adjustment bracket 125, the supporting force applied from the holding member 135 to the linear portion 62 is almost constant. Therefore, dispersion of absorption efficiency of the impact force by the second absorption can be reduced.

The above-described each embodiment may be changed to another embodiment like the following. Insofar as the supporting member supports a part of the linear portion 62 at the predetermined supporting force, the supporting member that supports a part of the linear portion 62 of the impact absorption member 60 may be formed without a pin portion. The supporting member, for example, may include a through hole extending in the axial direction. In this case, inserting the linear portion 62 into the through hole allows the supporting member to support a part of the linear portion 62 at the predetermined supporting force.

In this configuration, it is preferred that a first impact absorption member be disposed at one side of the steering column 50 in the vehicle width direction and a second impact absorption member be disposed at the other side of the steering column 50 in the vehicle width direction.

The supporting member may include a grip mechanism that grips a part of the linear portion 62 of the impact absorption member 60 from both sides of the linear portion 62 in the width direction. Insofar as the impact absorption member includes the elastic supporting portion 61 and the linear portion 62, the impact absorption member may be made of a material other than a wire rod.

Insofar as the steering device includes an impact absorption mechanism, the steering device may be a device without an adjustment mechanism for the tilt angle of the steering wheel 14. Insofar as the steering device includes the impact absorption mechanism, the steering device may be a device without an adjustment mechanism for a telescopic position of the steering wheel 14.

What is claimed is:

1. A steering device comprising:
a steering column that rotatably supports a steering wheel;
a column side bracket that supports the steering column;
a vehicle body side bracket coupled to the column side bracket; and
an impact absorption mechanism configured to move the steering column in a direction along the steering column in a second collision, wherein
the impact absorption mechanism includes:
an impact absorption member, and
a supporting member,
the impact absorption member being integrally formed with an elastic supporting portion and an extending portion,
the elastic supporting portion being supported by the vehicle body side bracket and elastically supporting the steering column,
the supporting member being supported by a vehicle body and supporting a part of the extending portion in a longitudinal direction of the extending portion, the supporting member being disposed on a first side of the steering column, and the supporting member deforming the extending portion that relatively moves with respect to the supporting member,
the elastic supporting portion having a portion that is engaged to the vehicle body side bracket, and extending to a second side of the steering column such that the second side of the steering column is opposite the first side of the steering column and the elastic support portion supports the steering column from below, and
the extending portion extending in a direction along the steering column at a position on the first side of the steering column above a position at which the elastic support portion is engaged to the vehicle body side bracket.

2. The steering device according to claim 1, wherein
the impact absorption member is made of a flexible wire rod.

3. The steering device according to claim 1, wherein
the supporting member includes a main body portion and a supporting portion, the main body portion being secured to the vehicle body, the main body portion supporting the vehicle body side bracket, the supporting portion supporting a part of the extending portion in the longitudinal direction, and
the main body portion allows the vehicle body side bracket to leave from the vehicle body when a load equal to or more than a predetermined load interacts with the vehicle body side bracket in the second collision.

4. The steering device according to claim 3, wherein
the extending portion has a length set so that a relative movement amount of the vehicle body side bracket with respect to the supporting member in the second collision is larger than a movement amount required for the vehicle body side bracket to leave from the vehicle body in the second collision.

5. The steering device according to claim 1, further comprising:
a mounting member mounted to the vehicle body, the mounting member supporting the vehicle body side bracket so that the vehicle body side bracket slidably moves in the direction along the steering column; and
a mounting plate disposed at an opposite side of the vehicle body side bracket sandwiching the mounting member, the mounting plate sandwiching the mounting member with the vehicle body side bracket, wherein
the supporting member is immovably disposed at the mounting member, and
the vehicle body side bracket and the mounting plate are configured to start leaving from the mounting member when a load equal to or more than a predetermined load interacts with the vehicle body side bracket in the second collision.

6. The steering device according to claim 5, wherein
the extending portion has a length set so that a relative movement amount of the vehicle body side bracket with respect to the supporting member in the second collision is larger than a movement amount required for the vehicle body side bracket to leave from the vehicle body in the second collision.

7. A steering device comprising:
a steering column that rotatably supports a steering wheel;
a column side bracket that supports the steering column;
a vehicle body side bracket coupled to the column side bracket;
an impact absorption mechanism configured to move the steering column in a direction along the steering column in a second collision;

a mounting member mounted to a vehicle body, the mounting member supporting the vehicle body side bracket so that the vehicle body side bracket slidably moves in the direction along the steering column; and a mounting plate disposed at an opposite side of the vehicle body side bracket sandwiching the mounting member, the mounting plate sandwiching the mounting member with the vehicle body side bracket, wherein:

the impact absorption mechanism includes an impact absorption member and a supporting member, the impact absorption member being integrally formed with an elastic supporting portion and an extending portion, the elastic supporting portion being supported by the vehicle body side bracket and elastically supporting the steering column, the extending portion extending in a direction along the steering column, the supporting member being supported by a vehicle body and supporting a part of the extending portion in a longitudinal direction of the extending portion, the supporting member is immovably disposed at the mounting member, and the vehicle body side bracket and the mounting plate are configured to start leaving from the mounting member when a load equal to or more than a predetermined load interacts with the vehicle body side bracket in the second collision.

8. The steering device according to claim 7, wherein the extending portion has a length set so that a relative movement amount of the vehicle body side bracket with respect to the supporting member in the second collision is larger than a movement amount required for the vehicle body side bracket to leave from the vehicle body in the second collision.

* * * * *